Figure 1:
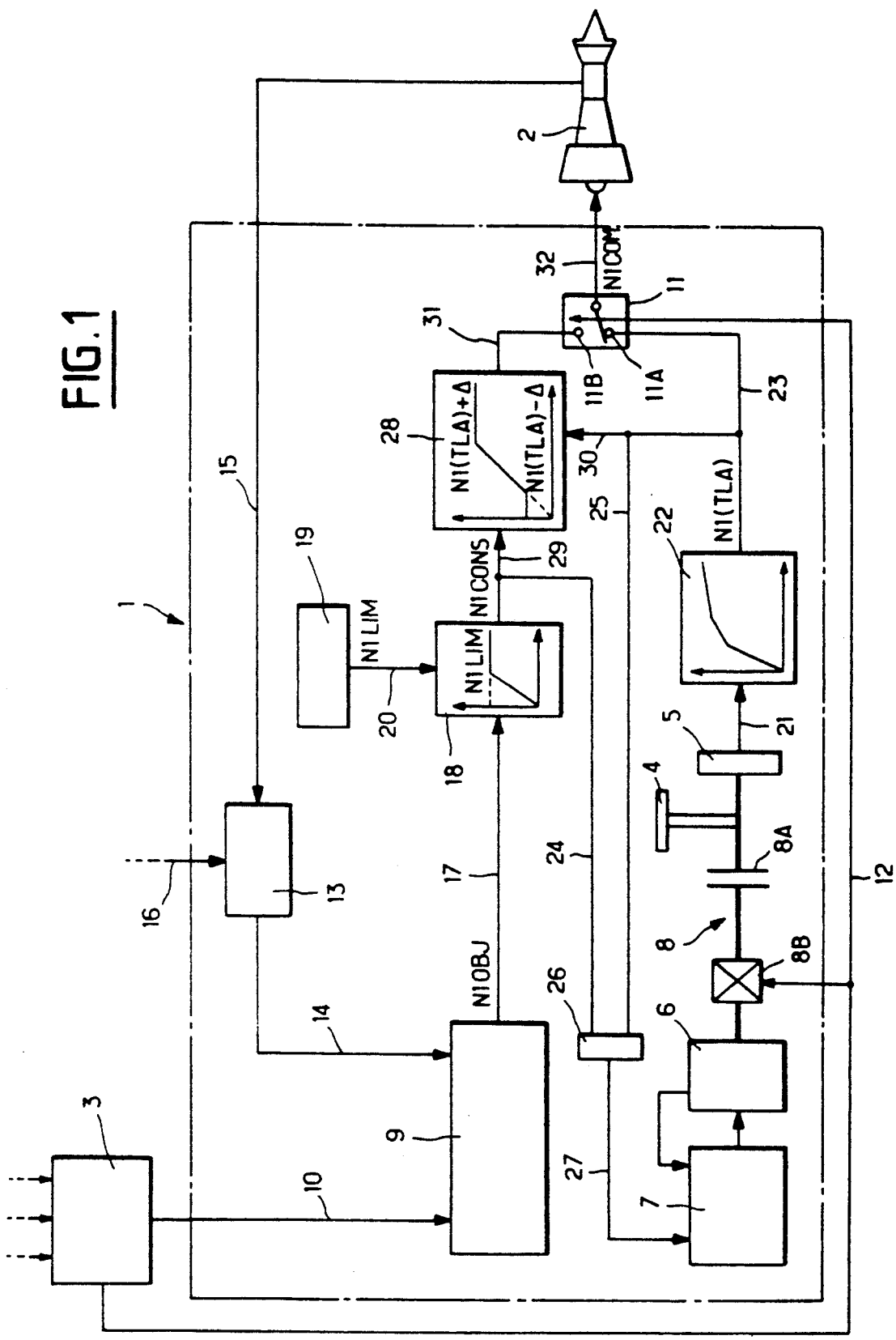

United States Patent [19]
Bissey et al.

[11] Patent Number: 5,277,024
[45] Date of Patent: Jan. 11, 1994

[54] DEVICE FOR CONTROLLING THE SPEED OF THE ENGINES OF AN AIRCRAFT

[75] Inventors: Bernard Bissey, Blagnac; Claude Maffre, La Salvetat St. Gilles, both of France

[73] Assignee: Aerospatiale Societe Nationale Industrielle, Paris, France

[21] Appl. No.: 921,238

[22] Filed: Jul. 29, 1992

[30] Foreign Application Priority Data

Aug. 12, 1991 [FR] France ................ 91 10237

[51] Int. Cl.$^5$ .............................................. F02C 9/00
[52] U.S. Cl. .................................................. 60/39.281
[58] Field of Search ........................ 60/39.15, 39.281

[56] References Cited

U.S. PATENT DOCUMENTS

| | | | |
|---|---|---|---|
| 4,032,757 | 6/1977 | Eccles | 60/39.281 |
| 4,134,257 | 1/1979 | Riple | 60/39.281 |
| 4,248,040 | 2/1981 | Kast | 60/39.281 |
| 4,407,118 | 10/1983 | Burrage | 60/39.281 |
| 4,478,038 | 10/1984 | Cropper et al. | 60/39.281 |
| 4,532,763 | 8/1985 | Pisano | 60/39.281 |
| 4,551,972 | 11/1985 | Lewis | 60/39.281 |
| 4,672,806 | 6/1987 | Pisano | 60/39.03 |
| 4,794,755 | 1/1989 | Hutto, Jr. et al. | 60/39.281 |
| 4,809,500 | 3/1989 | Roberts, Jr. | 60/235 |
| 4,821,193 | 4/1989 | Barber et al. | 60/39.281 |
| 4,984,425 | 1/1991 | Smith | 60/39.161 |
| 4,995,232 | 2/1991 | Sutton | 60/243 |
| 5,022,224 | 6/1991 | Smith | 60/39.161 |

FOREIGN PATENT DOCUMENTS

| | | |
|---|---|---|
| 0277904 | 10/1988 | European Pat. Off. |
| 0401152 | 12/1990 | European Pat. Off. |
| 2580034 | 10/1986 | France |
| 2079988 | 1/1982 | United Kingdom |
| 2134285 | 8/1984 | United Kingdom |
| 2217477 | 10/1989 | United Kingdom |
| 2228977 | 9/1990 | United Kingdom |
| WO82/00687 | 3/1982 | World Int. Prop. O. |

Primary Examiner—Richard A. Bertsch
Assistant Examiner—Howard R. Richman
Attorney, Agent, or Firm—Fisher, Christen & Sabol

[57] ABSTRACT

The present invention relates to a device for controlling the speed of the engines of an aircraft. According to the invention, the mechanical transmission (8) between the servomotor (6) and the throttle lever (4) comprises a coupling which can be overridden by the deliberate action of the hand of the pilot on the throttle lever (4), and the computer (18) comparing the speed to be reached X OBJ and the limit speed of the engine X LIM and supplying a signal which is representative of the datum speed of the engine X CONS, is linked to a computer (28), linked to the computer (22) supplying a signal which is representative of the speed of the engine corresponding to the position of the throttle lever X(TLA), said computer (28) supplying, from signals from the computers (18) and (22), a signal which is representative of the demanded speed of the engine X COM, such that:
if the relation $$X(TLA) - \Delta \leq X\ CONS \leq X(TLA) + \Delta \qquad (1)$$

(where $\Delta$ represents a defined value offset of tolerance) is satisfied, then X COM = X CONS, and
b) if the relation (1) is not satisfied, then $$X\ COM = X(TLA) - \Delta\ \text{if}\ X\ CONS < X(TLA) - \Delta,\ \text{and}$$

$$X\ COM = X(TLA) + \Delta\ \text{if}\ X\ CONS < X(TLA) + \Delta.$$

10 Claims, 4 Drawing Sheets

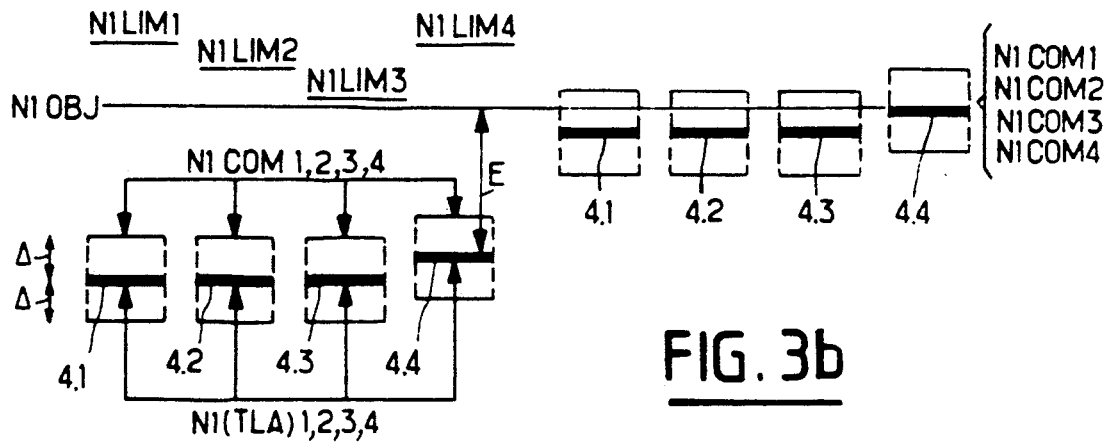
FIG. 3a
FIG. 3b
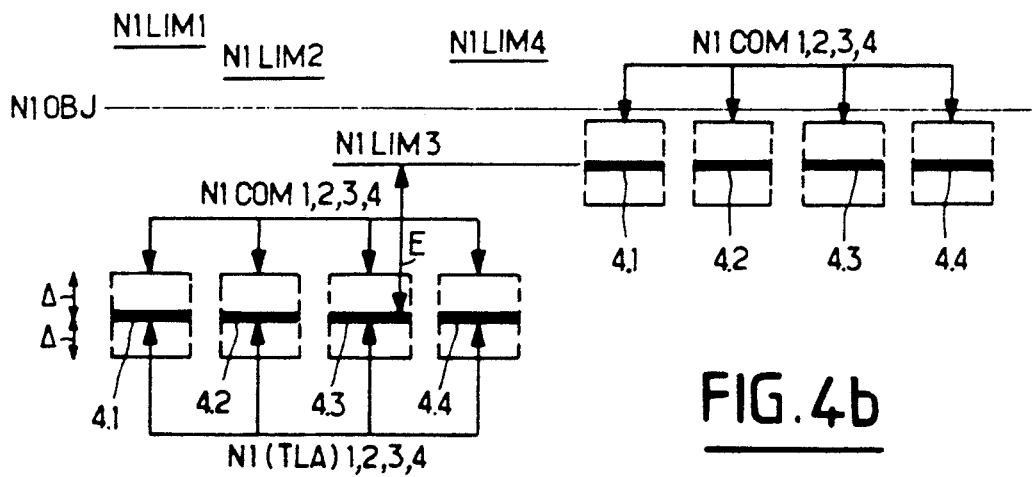
FIG. 4a
FIG. 4b

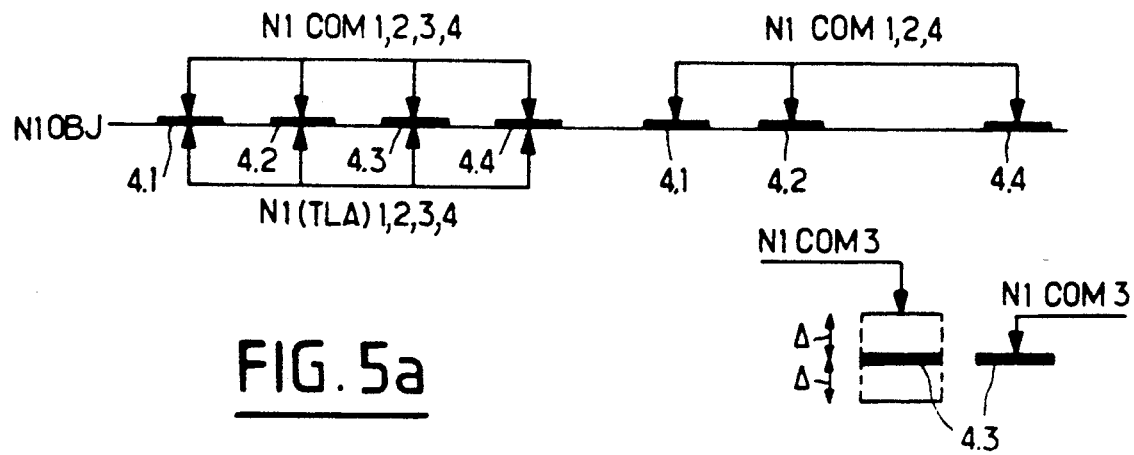
FIG.5a
FIG.5b
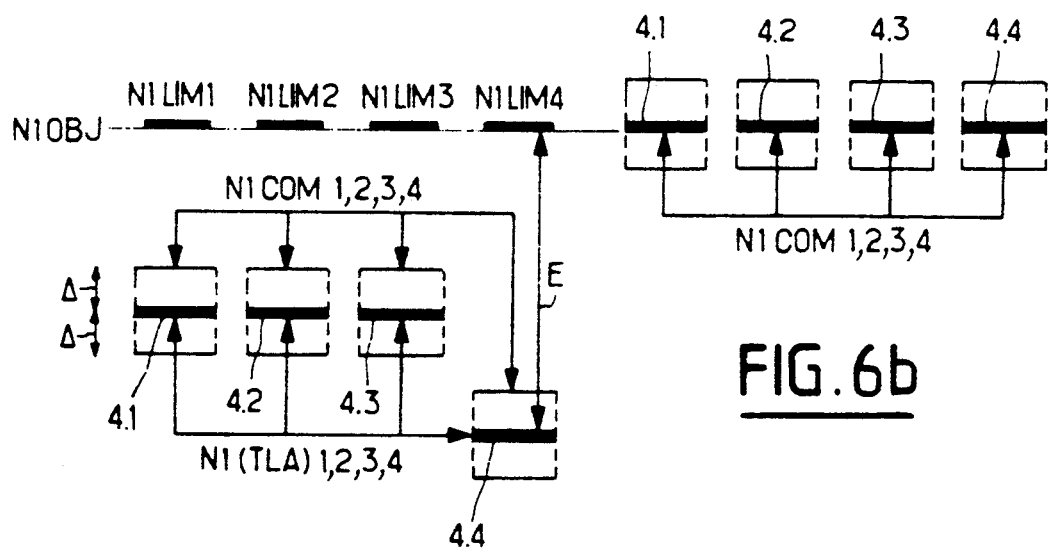
FIG.6b
FIG.6a

DEVICE FOR CONTROLLING THE SPEED OF THE ENGINES OF AN AIRCRAFT

The present invention relates to a device for controlling the speed of the engines of an aircraft.

It is known that the engines (or turbines) of an aircraft can be controlled manually or automatically, depending on the circumstances. To put it simply, it is possible to describe the control of an engine in the following way. In the first case, the pilot moves by hand a throttle lever whose positional changes are translated into variations in the power (thrust) supplied by the engine. In the second case, it is an automatic unit which acts on the settings of the engine instead of the hand of the pilot, in accordance with the instructions the automatic unit receives from the pilot. This automatic unit acts, as the case may be:

by virtue of its servomotor, directly on the throttle lever which the pilot therefore sees moving without touching it; the throttle lever can be mechanically linked to the fuel supply regulator of the corresponding engine, or it can be linked to an electrical position sensor which supplies information to the control computer for the engine;

directly on the control computer for the engine, without any effect on the movement of the throttle lever, as in Patent FR-2 580 034.

The drawbacks of the solutions set out above are the following:

in the case of the automatic unit acting on the throttle levers, the performance characteristics are afflicted by imperfections in all the mechanical elements involved in controlling the speed of the engines (threshold, hysteresis, inertia, in particular); moreover, it is difficult to equalize the speed of all the engines;

in the case of the automatic unit acting without moving the throttle levers, the position of the throttle levers does not represent the engine speed demanded by the device.

The object of the present invention is to avoid these drawbacks.

To that end, the device for controlling the speed of an aircraft engine, said aircraft comprising a control device, and able to be manipulated by a pilot, of the type comprising:

a throttle lever linked, on the one hand, to a sensor of the position of the latter and, on the other hand, to a servomotor provided with a control, by means of a mechanical transmission, said control device, allowing the pilot to choose the flight mode, being linked, on the one hand, to a first computer intended to calculate the speed of the engine to be reached X OBJ and, on the other hand, to switchover means with two positions, one corresponding to manual control and the other to automatic control, and comprising two inputs, "manual" and "automatic", said first computer further receiving information relating to parameters external to the engine, and delivering a first signal which is representative of the speed of the engine to be reached X OBJ to the input of a second computer, comparing said speed to be reached X OBJ and the limit speed of the engine X LIM, and delivering, at its output, a second signal which is representative of the datum speed of the engine X CONS, such that:

1) if X OBJ < X LIM then X CONS = X OBJ, and 2) if X OBJ ≧ X LIM then X CONS = X LIM, said position sensor being linked to the input of a third computer, supplying at its output a third signal which is representative of the speed of the engine corresponding to the position of the throttle lever X(TLA), and linked to the "manual" input of said switchover means, said second and third signals being supplied to the inputs of a comparator whose output is linked to the control of the servomotor, and the second computer being linked to the "automatic" input of said switchover means, is noteworthy, according to the invention, in that the mechanical transmission between the servomotor and the throttle lever comprises a coupling which can be overridden by the deliberate action of the hand of the pilot on the throttle lever, and in that the second computer is linked to the switchover means by means of a fourth computer linked, furthermore, to the third computer and supplying, from the second and third signals, a fourth signal which is representative of the demanded speed of the engine X COM, such that:

a) if the relation $$X(TLA) - \Delta \leqq X\ CONS \leqq X(TLA) + \Delta \qquad (1)$$

(where $\Delta$ represents a defined value offset or tolerance) is satisfied, then X COM = X CONS, and b) if relation (1) is not satisfied, then $$X\ COM = X(TLA) - \Delta \text{ if } X\ CONS < X(TLA) - \Delta, \text{ and}$$

$$X\ COM = X(TLA) + \Delta \text{ if } X\ CONS < X(TLA) + \Delta.$$

Hence, by virtue of the control device described above, the position of the throttle levers always represents the engine speed demanded by the device. Moreover, the performance characteristics are independent of imperfections in the mechanical elements involved in controlling the engine speed, and overriding of the device is possible by moving the throttle lever, while the engine speed does not exceed the limit speed corresponding to the phase of flight in question.

Advantageously, the mechanical transmission between the servomotor and the throttle lever comprises a friction coupling, associated with an electromagnetic clutch.

Moreover, the device may comprise an auxiliary computer for the limit speed of the engine X LIM and/or a device for processing information relating to parameters external and, possibly, internal to the engine, the device being linked to said first computer.

The present invention also relates to a device for controlling the speed of the engines of an aircraft, said aircraft comprising a plurality of engines and a control device, and able to be manipulated by a pilot, of the type comprising:

a plurality of throttle levers, each throttle lever being associated with an engine and linked, on the one hand, to a sensor of the position of the latter and, on the other hand, to a servomotor provided with a control, by means of a mechanical transmission, said control device, allowing the pilot to choose the flight mode, being linked, on the one hand, to a first computer intended to calculate the speed of the engines to be reached X OBJ and, on the other hand, for each engine to switchover means with two positions, one corresponding to manual control and the other to automatic control, and comprising two inputs, "manual" and "automatic", said first computer further receiving information relating to parameters external to the engines, and delivering a first signal which is representative of the speed of the engines to be reached X OBJ to the input of second computers, each second computer being associated with an engine and comparing said speed to be reached X OBJ and the limit speed of the respective engine X LIM, and delivering, at its output, a second signal which is representative of the datum speed of the respective engine X CONS, such that:

1) if X OBJ<X LIM then X CONS=X OBJ, and
2) if X OBJ≧X LIM then X CONS=X LIM, said position sensors being linked to the input of third computers, each third computer being associated with an engine and supplying at its output a third signal which is representative of the speed of the respective engine corresponding to the position of the throttle lever associated with said engine X(TLA), and being linked to the "manual" input of said switchover means, said second and third signals being supplied to the inputs of comparators each associated with an engine and each of whose outputs is linked to the control of the servomotor, and each second computer being linked to the "automatic" input of said switchover means, is noteworthy in that all the throttle levers are controlled by a single servomotor provided with a single control, linked to the output of said comparators by means of logic making it possible to choose a defined value from the plurality of values derived from said comparators, in that the mechanical transmission between the servomotor and each throttle lever comprises a coupling which can be overridden by the deliberate action of the hand of the pilot on the throttle lever, and in that each second computer is linked to the switchover means by means of a fourth computer linked, furthermore, to the third computer and supplying, from the second and third signals, a fourth signal which is representative of the demanded speed of the respective engine X COM such that:

a) if the relation $$X(TLA) - \Delta \leq X\ CONS \leq X(TLA) + \Delta \quad (1)$$

(where $\Delta$ represents a defined value offset or tolerance) is satisfied, then X COM=X CONS, and
b) if relation (1) is not satisfied, then $$X\ COM = X(TLA) - \Delta\ \text{if}\ X\ CONS < X(TLA) - \Delta,\ \text{and}$$

$$X\ COM = X(TLA) + \Delta\ \text{if}\ X\ CONS < X(TLA) + \Delta.$$

In the case of a plurality of engines, the advantages mentioned above are preserved, and, moreover, the speeds of the engines are identical and, despite possible misalignment of the throttle levers, less than a given value.

In particular, the logic may choose the smallest value or the largest value from the plurality of values derived from said comparators.

Advantageously, switchover means, which can be controlled by the control device, make it possible to pass from the choice of the smallest value to that of the largest, and conversely.

Preferably, the mechanical transmission between the servomotor and each throttle lever comprises a friction coupling, associated with an electromagnetic clutch.

Moreover, the control device of the invention may comprise an auxiliary computer for the limit speed of each engine and/or a device for processing information relating to parameters external and, possibly, internal to each engine, the device being linked to said first computer.

The figures of the attached drawing will make it easy to understand how the invention can be implemented. In these figures, identical references designate similar elements, and the general parameter X characterizing the engine speed takes the particular form of the parameter N1 preferred by certain engine manufacturers.

FIG. 1 diagrammatically illustrates an exemplary embodiment of the device in accordance with the invention, for controlling the speed of an aircraft engine.

Figure 2:
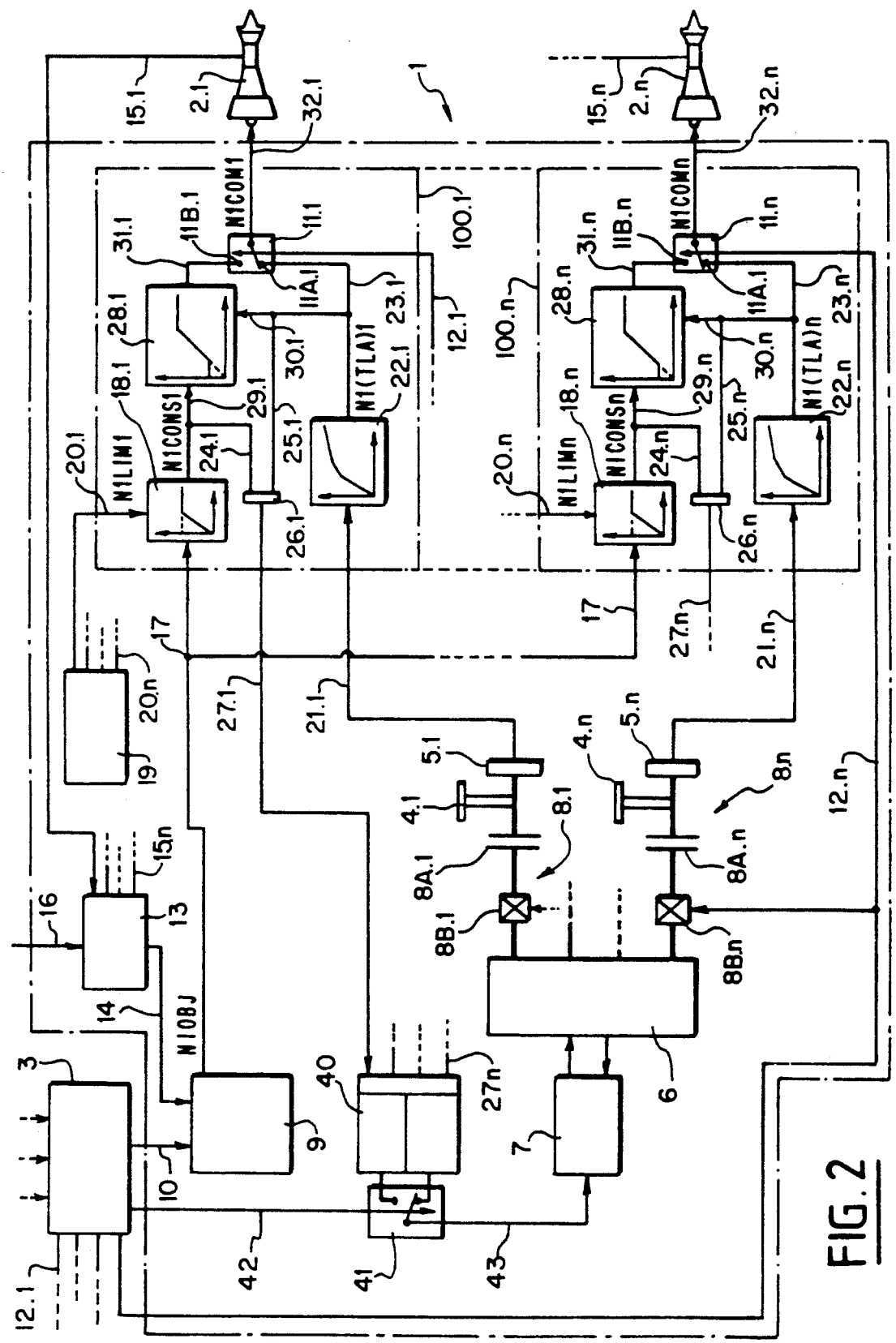

FIG. 2 shows a device in accordance with the invention for controlling the speed of n engines of an aircraft.

FIGS. 3a, b, 4a, b, 5a, b and 6a, b illustrate several examples of employment of the device of FIG. 2.

As FIG. 1 shows, the device 1 for controlling the speed of an aircraft engine 2, the aircraft (not represented) comprising a control device 3 and being able to be manipulated by a pilot, comprises a throttle lever 4 linked, on the one hand, to a sensor 5 for the position of the latter and, on the other hand, to a servomotor 6 provided with a control 7, by means of a mechanical transmission 8.

Moreover, the control device 3, especially allowing the pilot to choose the flight mode (that is to say at constant speed, at constant Mach number or at constant thrust, in particular), is linked, on the one hand, to a first computer 9 via a link 10, said computer being intended to calculate the speed of the engine to be reached (or "objective" speed) N1 OBJ, and, on the other hand, to a changeover switch 11 via a link 12, said changeover switch 11 being able to assume two positions, one corresponding to manual control and the other to automatic control, and comprising, for that purpose, a "manual" input 11A and an "automatic" input 11B. In the description of this exemplary embodiment, the speed of the rotor N1 has been chosen as a parameter which is characteristic of the behavior of the speed of the engines. This is, needless to say, not limiting, and it would be equally possible to utilize another parameter (designated above by "X"), such as the speed of a different rotor, the ratio of two flow pressures, for example.

Furthermore, the first computer 9 can receive, from a processing device 13, via a link 14, information relating to parameters internal (link 15) and, essentially, external (link 16) to the engine 2. These parameters, originating from a plurality of sensors (not represented) may be parameters internal to the engine (temperatures, pressures, speed of rotation of the rotors etc.), as well as parameters relating to the environment of the aircraft (temperatures, pressures, altitude, speed of the surrounding air, relative air speed of the aircraft, acceleration of the aircraft, etc.). Moreover, the first computer 9 delivers, via a link 17, a first signal which is representative of the speed of the engine to be reached N1 OBJ to the input of a second computer 18, comparing said speed to be reached N1 OBJ and the limit speed of the engine N1 LIM, originating from an auxiliary computer 19 via the link 20. The second computer 18 delivers, at its output, a second signal which is representative of the datum speed of the engine N1 CONS, such that:

1) if N1 OBJ < N1 LIM then N1 CONS = N1 OBJ, and
2) if N1 OBJ ≧ N1 LIM then N1 CONS = N1 LIM.

Furthermore, the position sensor 5 is linked, by the link 21, to the input of a third computer 22, supplying, at its output, a third signal which is representative of the speed of the engine corresponding to the position of the throttle lever N1(TLA), and linked, via the link 23, to the "manual" input 11A of the changeover switch 11.

As can also be seen in FIG. 1, the second and third signals are supplied, via respective links 24 and 25, to the inputs of a comparator 26 whose output is linked to the control 7 of the servomotor 6, via the link 27, and supplying, as a signal, the difference in the second and third signals.

More particularly, according to the invention, the mechanical transmission 8 between the servomotor 6 and the throttle lever 4 comprises a coupling which can be overridden by the deliberate action of the hand of the pilot on the throttle lever 4, for example a friction coupling 8A, associated with an electromagnetic clutch 8B (which is linked to the control device 3 by the link 12), and the second computer 18 is linked to the changeover switch 11 (this via a link 29) by means of a fourth computer 28, linked, moreover, to the third computer 22 by the link 30 and supplying, from second and third signals, a fourth signal which is representative of the demanded speed of the engine N1 COM, such that:
a) if the relation $$N1(TLA) - \Delta \leq N1\ CONS \leq N1\ (TLA) + \Delta \qquad (1)$$

(where $\Delta$ represents a defined value offset or tolerance) is satisfied, then N1 COM = N1 CONS, and
b) if the relation (1) is not satisfied, then N1 COM = N1 (TLA) − Δ if N1 CONS < N1 (TLA) − Δ, and N1 COM = N1 (TLA) + Δ if N1 CONS > N1(TLA) + Δ.

The output of the fourth computer 28 is linked, via the link 31, to the "automatic" input 11B of the changeover switch 11, whose output is linked to the engine 2 via the link 32, and by means of an appropriate interface.

The operation of the device which has just been described is as follows.

In the case where the control of the engine is commanded manually (changeover switch 11 in the "manual" position 11A), the throttle lever 4 is decoupled from the servomotor 6 (the electromagnetic clutch 8B being non-excited), and the speed of the engine 2 is a direct function of the position of the throttle lever 4 through the computer 22 establishing the relation:

N1 COM = N1 (TLA)

in which, as already indicated:
N1 COM is the demanded engine speed, and
N1(TLA) is the engine speed calculated as a function of the angular position of the throttle lever.

In automatic operation, the throttle lever 4 is integral with the servomotor 6 by means:
of the electromagnetic clutch 8B, excited when the automatic fuel control device is active (changeover switch 11 in the "automatic" position 11B), and of the friction coupling element 8A, which can be overridden when the pilot exerts a force on the throttle lever.

As a function of the reference levels set by the pilot, and of parameters external and, possibly, internal to the engine, the computer 9 calculates the engine speed to be reached ("objective" engine speed) N1 OBJ. Furthermore, the computer 19 calculates, as a function of the phase of flight, from the flight speed, the ambient temperature etc., a maximum authorized speed for the engine: N1 limit (N1 LIM).

The speed N1 OBJ is transmitted to the computer 18, at the same time as the speed N1 LIM, which computer supplies, at its output, the lower of the two values N1 OBJ and N1 LIM which becomes N1 datum (N1 CONS) usable for controlling the engine.

In other words,
if N1 OBJ < N1 LIM then N1 CONS = N1 OBJ, and
if N1 OBJ ≧ N1 LIM then N1 CONS = N1 LIM.

The order N1 CONS constitutes the input of a servo-control whose aim is to control the displacement of the throttle lever by the servomotor in such a way that the engine speed corresponding to the position of the throttle lever N1(TLA) is equal to N1 CONS. This servo-control may, for example, be a servocontrol of the speed of the servomotor.

If the pilot exerts a force on the throttle lever, he moves it, and N1(TLA) then becomes different from N1 CONS, which has the consequences examined below. It will be noted, however, in the case where the automatic unit is overridden, that the servomotor will continue to run as long as the action by the pilot on the throttle lever lasts, but that, as soon as this action ceases, the throttle lever will be brought back into the position corresponding to N1 CONS.

Furthermore, the computer 28 receiving the information item N1(TLA), which is still calculated whatever the circumstances, calculates the limit values:

(upper) N1 (TLA) + Δ

(lower) N1 (TLA) − Δ

($\Delta$ representing a predetermined value offset or tolerance).

The computer 28, furthermore receiving the signal N1 CONS from the computer 18, establishes the relation:

$$N1\ (TLA) - \Delta \leq N1\ CONS \leq N1\ (TLA) + \Delta \qquad (1).$$

If the relation (1) is satisfied, the computer 28 transmits the signal N1 CONS to the engine 2 and, in this case:

N1 COM = N1 CONS.

In contrast, if the relation (1) is not satisfied, the computer 28 no longer takes account of N1 CONS and fixes:

N1 COM = N1 (TLA) − Δ if N1 CONS < N1 (TLA) − Δ, and

N1 COM = N1 (TLA) + Δ if N1 CONS > N1 (TLA) + Δ.

The control device described exhibits the following advantages:
a) The position of the throttle lever represents the demanded engine speed (within a tolerance equal to Δ).

Hence, barring a breakdown or overriding of the automatic unit by application of a force to the throttle lever:

$$N1\ (TLA) = N1\ CONS\ \text{(servocontrol)}$$

which gives rise to:

$$N1\ (TLA) - \Delta \leq N1\ CONS \leq N1\ (TLA) + \Delta$$

and hence:

$$N1\ COM = N1\ CONS$$

Consequently:

$$N1\ (TLA) = N1\ COM$$

b) Overriding of the automatic unit is possible by movement of the lever.

In the case where the automatic unit is overridden, the pilot exerts a force on the lever and moves the latter, despite the reaction of the servomotor, by virtue of the friction coupling.

At that moment:

$$N1\ (TLA) \neq N1\ CONS$$

and the action of the computer 28 gives rise to the establishment of one of the two following relations (already formulated above):

$$N1\ COM = N1\ (TLA) - \Delta\ \text{if}\ N1\ CONS < N1\ (TLA) - \Delta,$$

$$N1\ COM = N1\ (TLA) + \Delta\ \text{if}\ N1\ CONS < N1\ (TLA) + \Delta.$$

c) The engine speed demanded by the automatic unit does not exceed the maximum authorized speed for the engine:

$$N1\ COM \leq N1\ LIM.$$

Moreover, the mechanical imperfections (friction, play, hysteresis) linked to the control of the lever have no effect on the performance characteristics of automatic control of the engine, at least as far as the engine speed offsets linked to these imperfections are less than $\Delta$.

FIG. 2 shows a device 1 for controlling the speed of the engines of an aircraft comprising a plurality of engines 2.1, ..., 2.n. It goes without saying that n is an integer which can be equal to 2, 3, 4 or more.

With each engine 2.1, ..., 2.n is associated a respective throttle lever 4.1, ..., 4.n linked, on the one hand, to a sensor 5.1, ..., 5.n of the position of the latter and, on the other hand, by means of a mechanical transmission 8.1, ..., 8.n, to a servomotor 6, common to all the throttle levers, provided with a single control 7. Each mechanical transmission 8.1, ..., 8.n comprises, as in the case of FIG. 1, a coupling which can be overridden by the deliberate action of the hand of the pilot on the corresponding throttle lever, for example a friction coupling 8A.1, ..., 8A.n associated with an electromagnetic clutch 8B.1, ..., 8B.n.

As before, a control device 3, allowing the pilot to choose the flight mode, is linked, on the one hand, to a first computer 9 (via the link 10) intended to calculate the speed of the engines to be reached N1 OBJ and, on the other hand, via links 12.1, ..., 12.n to changeover switches 11.1, ..., 11.n (such a changeover switch being provided for each engine) with two positions, one corresponding to manual control and the other to automatic control, and comprising two inputs, "manual" 11A.1, ..., 11A.n and "automatic" 11B.1, ..., 11B.n.

The first computer 9 receives, moreover, from the processing device 13, via a link 14, information relating to parameters internal (links 15.1, ..., 15.n) and, essentially, external (link 16) to the engines 2.1, ..., 2.n. Moreover, the first computer delivers, via the link 17, to the identical calculating units 100.1, ..., 100.n each associated with an engine 2.1, ..., 2.n, a first signal which is representative of the speed of the engines to be reached N1 OBJ, to the input of second computers 18.1, ..., 18.n associated respectively with each calculating unit 100.1, ..., 100.n and comparing the speed to be reached and the limit speed of the corresponding engine N1 LIM originating from the auxiliary computer 19 via the respective links 20.1, ..., 20.n. Each second computer 18.1, ..., 18.n delivers, at its output, a second signal which is representative of the datum speed of the corresponding engine N1 CONS, such that:

1) if N1 OBJ < N1 LIM then N1 CONS = N1 OBJ, and
2) if N1 OBJ ≧ N1 LIM then N1 CONS = N1 LIM.

Furthermore, each position sensor 5.1, ..., 5.n is linked, via the link 21.1, ..., 21.n, to the input of a third computer 22.1, ..., 22.n (belonging to the respective calculating unit 100.1, ..., 100.n), supplying, at its output, a third signal which is representative of the speed of the engine in question corresponding to the position of the respective lever N1(TLA), and linked, via the link 23.1, ..., 23.n, to the "manual" input 11A.1, ..., 11A.n of the changeover switch 11.1, ..., 11.n.

In each calculating unit 100.1, ..., 100.n, the second and third signals are supplied, via the respective links 24.1, ..., 24.n and 25.1, ..., 25.n, to the inputs of a comparator 26.1, ..., 26.n whose output is linked, via the link 27.1, ..., 27.n, to logic circuit means 40 making it possible to choose, from the plurality of values derived from the comparators 26.1, ..., 26.n (difference of the second and third signals), the smallest value or the largest value. A changeover switch 41, which can be controlled by the control device 3 (link 42), makes it possible to pass from the choice of the smallest value to that of the largest, and conversely. The output of the changeover switch 41 is linked to the control 7 of the servomotor 6 via a link 43.

Furthermore, in each calculating unit 100.1, ..., 100.n, the second computer 18.1, ..., 18.n is linked to the changeover switch 11.1, ..., 11.n by means of a fourth computer 28.1, ..., 28.n (this via a link 29.1, ..., 29.n) linked, furthermore, to the third computer 22.1, ..., 22.n by the link 30.1, ..., 30.n and supplying, from second and third signals, a fourth signal which is representative of the demanded speed of the corresponding engine N1 COM, such that:

a) if the relation $$N1\ (TLA) - \Delta \leq CONS \leq N1\ (TLA) + \Delta \tag{1}$$

(where $\Delta$ represents a defined value offset of tolerance) is satisfied, then N1 COM = N1 CONS, and b) if the relation (1) is not satisfied, then $$N1\ COM = N1\ (TLA) - \Delta\ \text{if}\ N1\ CONS < N1\ (TLA) - \Delta,\ \text{and}$$

N1 COM = N1 (TLA) + Δ if N1 CONS < N1 (TLA) + Δ.

The output of the fourth computer 28.1, ..., 28.n is linked, via the link 31.1, ..., 31.n, to the "automatic" input 11B.1, ..., 11B.n of the changeover switch 11.1, ..., 11.n, whose output is linked to the respective engine 2.1, ..., 2.n by the link 32.1, ..., 32.n, and by means of an appropriate interface.

The following examples illustrate the operation of the device of FIG. 2. It will be noted that, in FIGS. 3a, 3b, 4a, 4b, 5a, 5b and 6a, 6b, for reasons of clarity in the explanation, the positions of the levers 4.1, 4.2, 4.3 and 4.4 and the corresponding speeds N1(TLA)1,2,3,4 coincide.

Logic 1: choosing the smallest value.

This choice corresponds to the majority of instances of use. The three examples, illustrated by FIGS. 3a, 3b, 4a, 4b and 5a, 5b, show, taking account of the dispersions of the limit speeds and of the positions of the levers, the operation of this choice logic and indicate the value N1 COM of the demanded speed for each engine. For reasons of clarity and simplicity, these examples are limited to the case of an aircraft comprising four engines.

Example 1 (FIGS. 3a and 3b)

In FIG. 3a is represented the position of the levers 4.1, 4.2, 4.3, 4.4 before reaction by the servo-motor, each corresponding to a speed N1(TLA)1,2,3,4, and, in FIG. 3b, after reaction by the servomotor. As is seen in FIG. 3a, the levers are initially slightly offset, and the speed N1 OBJ before reaction by the servomotor is such that this speed is less than the limit speed of each engine. The deviation E taken into account by the logic is then that of the smallest value (N1 OBJ-N1(TLA)4) corresponding to the lever 4.4. After reaction by the servomotor (FIG. 3b), and on condition that the offsets between N1(TLA)1,2,3,4 are less than Δ, the demanded speed for each engine is the same and equal to N1 OBJ.

Example 2 (FIGS. 4a and 4b)

The levers 4.1, 4.2, 4.3, 4.4 are initially aligned (FIG. 4a), and the speed N1 OBJ, before reaction by the servomotor, exceeds the limit speed of the third engine. The deviation E taken into account by the logic will then be that between N1 LIM3 and N1(TLA)3, and, after reaction by the servomotor (FIG. 4b), the levers 4.1, 4.2, 4.3, 4.4 will be aligned on N1 LIM3. No engine will be overspeeding, and the difference between the demanded speeds will be equal to Δ at the most.

Example 3 (FIGS. 5a and 5b)

In this example, from the initial condition illustrated by FIG. 5a, the lever 4.3 is misaligned in the reducing direction, then it is declutched. The speed demanded of engines No. 1, 2 and 4 is unchanged and equal to N1 OBJ. The speed demanded from engine No. 3 (N1 COM3) is equal to N1(TLA)3 + Δ during overriding of the automatic unit (on the left in FIG. 5b). After declutching the lever 4.3, the pilot can relax his force on this lever, and the speed will be equal to N1(TLA)3 (right in FIG. 5b) and hence will no longer be a function of the automatic unit.

Logic 2: choosing the largest value.

This choice corresponds to implementing protection for the aircraft for which the limit takeoff thrust of the four engines has to be available, irrespective of the initial offset in the throttle levers. Takeoff speed corresponds to the end stops of the levers.

Example 4 (FIGS. 6a and 6b)

The levers 4.1, 4.2, 4.3, 4.4 are initially misaligned (FIG. 6a). N1 OBJ is equal to the maximum speed of the engines corresponding to the levers against the stops. The deviation E taken into account by the logic is the greatest of the four deviations (lever 4.4), which makes it possible to bring, by virtue of the friction couplings, the four levers against the stop (FIG. 6b), after reaction by the servomotor, and to thus have speed equal to the maximum takeoff speed demanded from the four engines.

The device according to the invention exhibits, in short, the following advantages:

1) The speeds of the engines are equal despite the possible existence of misalignment in the levers, as long as this misalignment does not represent a speed deviation greater than Δ. The value of Δ will be a compromise between:
   the maximum misalignment tolerated by the levers for which the device controls identical thrust from all the engines,
   the maximum variation in thrust acceptable at the moment of disengagement of the automatic unit.
2) The performance characteristics are not degraded by imperfections in the mechanical elements, such as friction, thresholds and hysteresis.
3) The device drives the levers so that the position of the latter represents the thrust of the corresponding engine. Furthermore, exceeding the limit speeds is avoided, while allowing overriding by the deliberate action of the pilot.

We claim:

1. A device for controlling the speed of an aircraft engine, said engine of an aircraft comprising a control device, and able to be manipulated by a pilot, of the type comprising:

a throttle lever (4) linked, on the one hand, to a sensor (5) of the position of the latter and, on the other hand, to a servomotor (6) provided with a control (7), by means of a mechanical transmission (8), said control device (3), allowing the pilot to choose the flight mode, being linked, on the one hand, to a first computer (9) intended to calculate the speed of the engine to be reached X OBJ and, on the other hand, to switchover means (11) with two positions, one corresponding to manual control and the other to automatic control, and comprising two inputs, "manual" (11A) and "automatic" (11B), said first computer (9) further receiving information relating to parameters external to the engine, and delivering a first signal which is representative of the speed of the engine to be reached X OBJ, to the input of a second computer (18), comparing said speed to be reached X OBJ and the limit speed of the engine X LIM, and delivering, at its output, a second signal which is representative of the datum speed of the engine X CONS, such that:
  1) if X OBJ < X LIM then X CONS = X OBJ, and
  2) if X OBJ ≧ X LIM then X CONS = X LIM, said position sensor (5) being linked to the input of a third computer (22), supplying at its output a third signal which is representative of the speed of the engine corresponding to the position of the throttle lever X(TLA), and linked to the "manual" input (11A) of said switchover means (11), said second and third signals being supplied to the inputs of a comparator (26) whose output is linked to the control (7) of the servomotor (6), and the second computer (18) being linked to the "automatic" (11B) input of said switchover means (11), wherein the mechanical transmission (8) between the servomotor (6) and the throttle lever (4) comprises a coupling which can be overridden by the deliberate action of the hand of the pilot on the throttle lever (4), and wherein the second computer (18) is linked to the switchover means (11) by means of a fourth computer (28) linked, furthermore, to the third computer (22) and supplying, from the second and third signals, a fourth signal which is representative of the demanded speed of the engine X COM, such that:

a) if the relation $$X(TLA) - \Delta \leq X \, CONS \leq X(TLA) + \Delta \quad (1)$$

(where $\Delta$ represents a defined value offset or tolerance) is satisfied, then X COM = X CONS, and b) if relation (1) is not satisfied, then $$X \, COM = X(TLA) - \Delta \text{ if } X \, CONS < X(TLA) - \Delta, \text{ and}$$

$$X \, COM = X(TLA) + \Delta \text{ if } X \, CONS < X(TLA) + \Delta.$$

2. The device as claimed in claim 1, wherein the mechanical transmission (8) between the servomotor (6) and the throttle lever (4) comprises a friction coupling (8A), associated with an electromagnetic clutch (8B).

3. The device as claimed in claim 1, further comprising an auxiliary computer (19) for generating the limit speed of the engine X LIM.

4. The device as claimed in claim 1, further comprising a device (13) for processing information relating to parameters external and/or internal to the engine (2), the device being linked to said first computer (9).

5. A device for controlling the speed of the engines of an aircraft, said aircraft comprising a plurality of engines and a control device, and able to be manipulated by a pilot, of the type comprising:

a plurality of throttle levers (4.1, ..., 4.n), each throttle lever being associated with an engine and linked, on the one hand, to a sensor (5.1, ..., 5.n) of the position of the latter and, on the other hand, to a servomotor (6) provided with a control (7), by means of a mechanical transmission (8.1, ..., 8.n), said control device (3), allowing the pilot to choose the flight mode, being linked, on the one hand, to a first computer (9) intended to calculate the speed of the engines to be reached X OBJ and, on the other hand, for each engine, to switchover means (11.1, ..., 11.n) with two positions, one corresponding to manual control and the other to automatic control, and comprising two inputs, "manual" (11A.1, ..., 11A.n) and "automatic" (11B.1, ..., 11B.n), said first computer (9) further receiving information relating to parameters external to the engines, and delivering a first signal which is representative of the speed of the engines to be reached X OBJ to the input of second computers (18.1, ..., 18.n), each second computer being associated with an engine and comparing said speed to be reached X OBJ and the limit speed of the respective engine X LIM, and delivering, at its output, a second signal which is representative of the datum speed of the respective engine X CONS, such that:

1) if X OBJ < X LIM then X CONS = X OBJ, and 2) if X OBJ $\geq$ X LIM then X CONS = X LIM, said position sensors (5.1, ..., 5.n) being linked to the input of third computers (22.1, ..., 22.n), each third computer being associated with an engine and supplying at its output a third signal which is representative of the speed of the respective engine corresponding to the position of the throttle lever associated with said engine X(TLA), and being linked to the "manual" input (11A.1, ..., 11A.n) of said switchover means (11.1, ..., 11.n), said second and third signals being supplied to the inputs of comparators (26.1, ..., 26.n) each associated with an engine and each of whose outputs is linked to the control (7) of the servomotor (6), and each second computer (18.1, ..., 18.n) being linked to the "automatic" input (11B.1, ..., 11B.n) of said switchover means (11.1, ..., 11.n), wherein all the throttle levers (4.1, ..., 4.n) are controlled by a single servomotor (6) provided with a single control (7), linked to the output of said comparators (26.1, ..., 26.n) by means of logic circuit means (40) making it possible to choose a defined value from the plurality of values derived from said comparators, wherein the mechanical transmission (8.1, ..., 8.n) between the servomotor (6) and each throttle lever (4.1, ..., 4.n) comprises a coupling which can be overridden by the deliberate action of the hand of the pilot on the throttle lever (4.1, ..., 4.n), and wherein each second computer (18.1, ..., 18.n) is linked to the switchover means (11.1, ..., 11.n) by means of a fourth computer (28.1, ..., 28.n) linked, furthermore, to the third computer (22.1, ..., 22.n) and supplying, from the second and third signals, a fourth signal which is representative of the demanded speed of the respective engine X COM such that:

a) if the relation $$X(TLA) - \Delta \leq X \, CONS \leq X(TLA) + \Delta \quad (1)$$

(where $\Delta$ represents a defined value offset or tolerance) is satisfied, then X COM = X CONS, and b) if relation (1) is not satisfied, then $$X \, COM = X(TLA) - \Delta \text{ if } X \, CONS < X(TLA) - \Delta, \text{ and}$$

$$X \, COM = X(TLA) + \Delta \text{ if } X \, CONS < X(TLA) + \Delta.$$

6. The device as claimed in claim 5, wherein the logic circuit means (40) chooses the smallest value or the largest value from the plurality of values derived from said comparators (26.1, ..., 26.n).

7. The device as claimed in claim 6, wherein the switchover means (11.1, ..., 11.n), which can be controlled by the control device (3), make it possible to pass from the choice of the smallest value to that of the largest, and conversely.

8. The device as claimed in claim 5, wherein the mechanical transmission (8.1, ..., 8.n) between the servomotor (6) and each throttle lever (4.1, ..., 4.n) comprises a friction coupling (8A.1, ..., 8A.n), associated with an electromagnetic clutch (8B.1, ..., 8B.n).

9. The device as claimed in claim 5, further comprising an auxiliary computer (19) for the limit speed of each engine.

10. The device as claimed in claim 5, further comprising a device (13) for processing information relating to parameters external and/or internal to each engine (2.1, ..., 2.n), the device being linked to said first computer (9).

* * * * *

UNITED STATES PATENT AND TRADEMARK OFFICE
CERTIFICATE OF CORRECTION

PATENT NO. : 5,277,024

DATED : January 11, 1994

INVENTOR(S) : Bernard BISSEY and Claude MAFFRE

It is certified that error appears in the above-identified patent and that said Letters Patent is hereby corrected as shown below:

In the last line of the Abstract, after "X COM=X(TLA)+$\Delta$ if X CONS", delete "$<$" and insert instead --$>$--. In column 2, line 33, after "X COM=X(TLA)+$\Delta$ if X CONS", delete "$<$" and insert instead --$>$--. In column 3, line 55, after "X COM=X(TLA)+$\Delta$ if X CONS", delete "$<$" and insert instead --$>$--. In column 6, line 50, after "N1 (TLA)-$\Delta$ N1$\leq$CONS", delete "$\geq$" and insert instead --$\leq$--. In column 7, line 34, after "N1 COM=N1(TLA)+$\Delta$ if N1 CONS", delete "$<$" and insert instead --$>$--. In column 9, line 1, after "N1 COM=N1(TLA)+$\Delta$ if N1 CONS", delete "$<$" and insert instead --$>$--. In Claim 1, last line, after "X COM=X(TLA)+$\Delta$ if X CONS", delete "$<$" and insert instead --$>$--. In Claim 5, last line, after "X COM=X(TLA)+$\Delta$ if X CONS", delete "$<$" and insert instead --$>$--.

Signed and Sealed this

Twenty-seventh Day of September, 1994

Attest:

BRUCE LEHMAN

*Attesting Officer*       *Commissioner of Patents and Trademarks*